US 11,919,614 B2

(12) United States Patent
Takeshige et al.

(10) Patent No.: US 11,919,614 B2
(45) Date of Patent: Mar. 5, 2024

(54) OUTBOARD MOTOR AND OUTBOARD MOTOR CONTROL DEVICE (71) Applicant: HONDA MOTOR CO., LTD., Tokyo (JP)

(72) Inventors: Takamasa Takeshige, Wako (JP); Tomohiro Miyauchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 449 days.

(21) Appl. No.: 17/299,328

(22) PCT Filed: Dec. 4, 2018

(86) PCT No.: PCT/JP2018/044587
§ 371 (c)(1),
(2) Date: Jun. 3, 2021

(87) PCT Pub. No.: WO2020/115817
PCT Pub. Date: Jun. 11, 2020

(65) Prior Publication Data
US 2022/0055730 A1 Feb. 24, 2022

(51) Int. Cl.
*B63H 21/21* (2006.01)
*F02B 61/04* (2006.01)
(Continued)

(52) U.S. Cl.
CPC ......... *B63H 21/213* (2013.01); *F02B 61/045* (2013.01); *F02B 75/18* (2013.01);
(Continued)

(58) Field of Classification Search
CPC ............ B63H 21/213; B63H 2021/216; F02B 61/045; F02B 75/18; F02D 41/30; F02D 2200/101; F02P 9/00
See application file for complete search history.

(56) References Cited

U.S. PATENT DOCUMENTS 8,961,246 B1 * 2/2015 Kirchhoff ............. B63H 21/21
477/109
2009/0124141 A1 * 5/2009 Ito ........................ B63H 21/213
440/1

FOREIGN PATENT DOCUMENTS

EP          1857357 A2 * 11/2007 ............. B63H 21/21
JP          09-151756       6/1997
JP          2009-119956     6/2009

OTHER PUBLICATIONS

International Search Report and Written Opinion for International Application No. PCT/JP2018/044587 dated Feb. 19, 2019, 9 pages.

* cited by examiner

*Primary Examiner* — Stephen P Avila
(74) *Attorney, Agent, or Firm* — Amin, Turocy & Watson, LLP (57) ABSTRACT

An outboard motor is provided with: an encoder which detects the rotational speed of an engine; a position sensor which detects an operating position of a shift lever; and a state quantity detection unit which detects a state quantity of a shift actuator. A control device of the outboard motor determines whether the state quantity is more than or equal to a stop-initiating threshold value when the operating position has been switched. If the state quantity is more than or equal to the stop-initiating threshold value, the control device implements a stop control to stop ignition and/or fuel injection in the engine.

11 Claims, 4 Drawing Sheets (51) Int. Cl.
*F02B 75/18* (2006.01)
*F02D 41/30* (2006.01)
*F02P 9/00* (2006.01)

(52) U.S. Cl.
CPC ................ *F02D 41/30* (2013.01); *F02P 9/00* (2013.01); *B63H 2021/216* (2013.01); *F02D 2200/101* (2013.01)

OUTBOARD MOTOR AND OUTBOARD MOTOR CONTROL DEVICE

TECHNICAL FIELD

The present invention relates to an outboard motor including a shift actuator that shifts a rotational output of an internal combustion engine, and relates also to a control device of the outboard motor (outboard motor control device).

BACKGROUND ART

An outboard motor has: an internal combustion engine (an engine); a gear mechanism that shifts a rotational output of the engine; and a propeller that rotates based on the rotational output of the gear mechanism. The outboard motor propels a ship body under rotation of the propeller. The gear mechanism of the outboard motor switches meshing of driven gears axially rotating based on rotation of a drive shaft (a drive gear) coupled to the engine, and a dog clutch coupled so as to be advanceable/retractable relative to the propeller, under operation of a shift lever by a ship operator (a user) of the ship body, and thereby performs a gear shifting including a change of direction of travel.

For example, JP 2009-119956 A discloses an outboard motor that performs switching of the dog clutch with respect to the driven gears by electrically controlling a shift actuator by means of a control unit (an ECU) receiving an operating position of the shift lever.

SUMMARY OF INVENTION

Incidentally, the propeller of the outboard motor is subject to a large resistance from water during navigation of the ship body. This results in that, particularly in the case of the engine rotating at high speed, the dog clutch to which the resistance-receiving propeller is coupled, and the driven gear, strongly mesh with each other. There is thus a possibility that, even if the shift actuator attempts to switch meshing of the gears based on operation of the shift lever by the user, meshing of the dog clutch and the driven gear cannot be easily disengaged.

In the case of meshing of the dog clutch and the driven gear having continued, it may lead to a large current flowing for a long time in the shift actuator. As a result, there is a possibility that durability of the shift actuator may decline.

The present invention has been made in view of the above-described realities, and has an object of providing an outboard motor and a control device of the outboard motor, in which meshing of gears can be easily disengaged and durability of a shift actuator can thereby be significantly improved.

In order to achieve the previously described object, a first aspect of the present invention is an outboard motor having a shift actuator that shifts a rotational output of an internal combustion engine based on a position of a shift lever operated by a user, the outboard motor including: an operating position detection unit that detects an operating position of the shift lever; a state quantity detection unit that detects a state quantity of the shift actuator; and a control unit that performs processing based on the detected operating position and state quantity, wherein, when the operating position has been switched, the control unit determines whether the state quantity is greater than or equal to a stop-initiating threshold value or not, and, if the state quantity is greater than or equal to the stop-initiating threshold old value, the control unit performs control to suppress at least one of ignition and fuel injection in the internal combustion engine.

Moreover, in order to achieve the previously described object, a second aspect of the present invention is a control device of an outboard motor, the outboard motor including a shift actuator that shifts a rotational output of an internal combustion engine based on a position of a shift lever operated by a user, the control device including: an operating position acquisition unit that acquires an operating position of the shift lever; a state quantity acquisition unit that acquires a state quantity of the shift actuator; and a determination processing unit that, when the operating position has been switched, determines whether the state quantity is greater than or equal to a stop-initiating threshold value or not, and, if the state quantity is greater than or equal to the stop-initiating threshold value, performs control to suppress at least one of ignition and fuel injection in the internal combustion engine.

The above-described outboard motor and control device of an outboard motor perform control to suppress at least one of ignition and fuel injection in an internal combustion engine. This control results in that, even when gears switched by a shift actuator are strongly meshing due to high-speed rotation of the internal combustion engine, a rotational speed of the internal combustion engine can be rapidly lowered to weaken meshing of the gears. Hence, the outboard motor makes it possible for meshing of the gears to be simply disengaged, and enables durability of the shift actuator to be significantly improved.

DESCRIPTION OF EMBODIMENTS

A preferred embodiment of the present invention will be presented and described in detail below with reference to the accompanying drawings.

Figure 1:
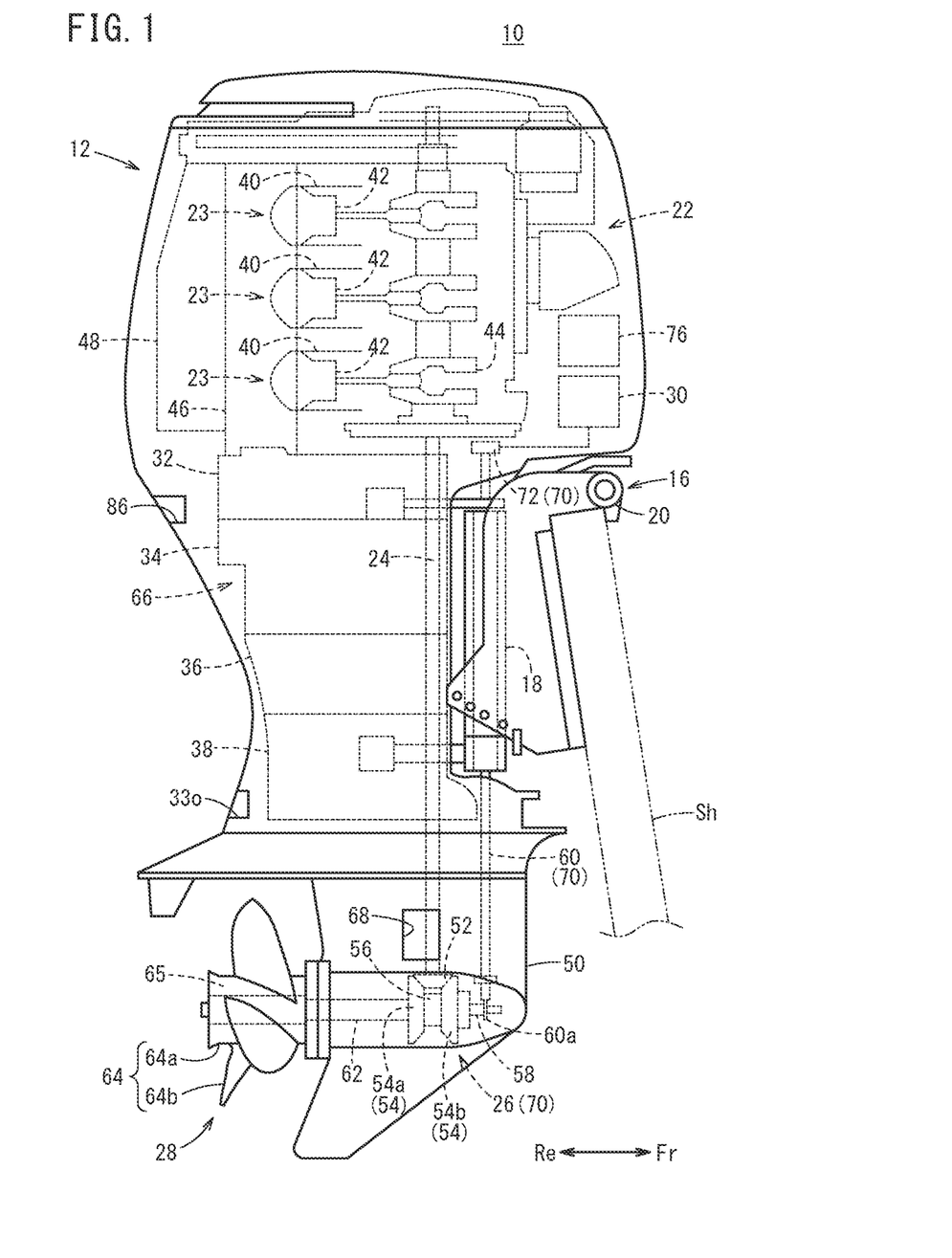
FIG. 1 is a side view showing an overall configuration of an outboard motor according to an embodiment of the present invention.

An outboard motor 10 according to an embodiment of the present invention, as shown in FIG. 1, is mounted on a ship body Sh as a power source of a small ship or the like, and is driven under operation of a ship operator (a user) to propel the ship body Sh. The outboard motor 10 comprises: a housing 12 configuring an outward appearance; and a mounting mechanism 16 by which the outboard motor 10 is fixed to the ship body Sh on a front (on an arrow Fr direction side) side of the housing 12. The mounting mechanism 16 enables the housing 12 to swing to left and right around a swivel shaft 18 in planar view, and enables the housing 12 including the swivel shaft 18 to revolve clockwise in FIG. 1 or counterclockwise in FIG. 1 around a tilt shaft 20.

On an inside of the housing 12, there are housed an engine 22 (an internal combustion engine), a drive shaft 24, a gear mechanism 26, a propeller mechanism 28, and a control device 30. Moreover, on a side below the engine 22 within the housing 12, there are stacked in order from an upper portion to a lower portion a mounting bracket 32, an oil case 34, an upper separator 36, and an extension case 38.

As the engine 22, there is applied a vertical type multi-cylinder engine (for example, a 3-cylinder engine).

The engine 22 includes three cylinder tubes 40 lined up parallelly in an up-down direction, each of whose axis line is sideways-facing (substantially horizontal). The engine further includes, extended therein in the up-down direction, a crank shaft 44 which is coupled to piston rods 42 of each of the cylinder tubes 40. A plurality of cylinders 23 each comprise an ignition device 23a and a fuel injection device 23b (refer to FIG. 2). By a fuel being injected into the cylinder tube 40 from the fuel injection device 23b depending on a position of the piston rod 42, and ignition being performed by the ignition device 23a in each of the cylinders 23, the cylinders 23 each cause the piston rod 42 to move in a reciprocating manner. Moreover, a cylinder block 46 and a cylinder head 48 of the engine 22 are provided with an unillustrated cooling water jacket that cools the engine 22.

A lower end portion of the crank shaft 44 of the engine 22 has coupled thereto an upper end of the drive shaft 24. The drive shaft 24 extends in the up-down direction (a longitudinal direction) within the housing 12, and freely rotates around its own axis. A lower end of the drive shaft 24 is housed in the gear mechanism 26.

The gear mechanism 26 configures part of a transmission structure 70 that shifts a rotational output of the engine 22 based on a position of a shift lever 74 (refer to FIG. 2) operated by the user. Note that in the present specification, "shift" includes switching of a direction of travel (forward, reverse) of the ship body Sh.

This gear mechanism 26 has a gear case 50 which houses a plurality of gears. The gear mechanism 26 comprises: a drive bevel gear 52 which is fixed to the lower end of the drive shaft 24; and driven bevel gears 54 (a forward-movement driven bevel gear 54a, a reverse-movement driven bevel gear 54b) that mesh with the drive bevel gear 52 to rotate in a direction orthogonal to the drive shaft 24 under rotation of the drive bevel gear 52. Moreover, the gear mechanism 26 has: a dog clutch 56 capable of meshing with tooth surfaces on inner sides of the driven bevel gears 54; and a shift slider 58 coupled via an unillustrated coupling bar to the dog clutch 56. The shift slider 58 extends so as to be advanceable and retractable along an inside of a propeller shaft 62 of the later-mentioned propeller mechanism 28, and has its end portion on a front side exposed from the propeller shaft 62. The shift slider 58 comprises a groove in its exposed portion, and this groove has inserted therein a cam portion 60a of an operating shaft 60 extending above the gear case 50.

By the shift slider 58 moving in an axial direction of the propeller shaft 62 due to rotation of the operating shaft 60, the gear mechanism 26 moves the dog clutch 56 between the pair of driven bevel gears 54. Thus, a tooth surface of the dog clutch 56 meshes with one of the unillustrated inner side tooth surface of the forward-movement driven bevel gear 54a or inner side tooth surface of the reverse-movement driven bevel gear 54b. As a result, a rotational driving force of the driven bevel gear 54 is transmitted to the dog clutch 56, and the rotational driving force is further transmitted to the propeller shaft 62 from the dog clutch 56 via the coupling bar.

The propeller mechanism 28, which is provided on a rear (an arrow Re direction) side of a lower portion of the housing 12, has: the propeller shaft 62 which is capable of rotating around its own axis; and a propeller main body 64 coupled to the propeller shaft 62. The propeller shaft 62 has its one end portion (its front portion) disposed in the gear mechanism 26 in a state of the shift slider 58 having been housed on its inside as mentioned above. The propeller shaft 62 has a long hole (not illustrated) in which the coupling bar coupling between the dog clutch 56 and the shift slider 58 is disposed in a manner enabling the coupling bar to move in an axial direction of the long hole.

The propeller main body 64 has: a tubular body 64a that surrounds the propeller shaft 62 on an outer side in a radial direction of the propeller shaft 62; and a plurality of fins 64b that are coupled to an outer peripheral surface of the tubular body 64a. An inner side of this tubular body 64a is provided with a through-hole 65 that discharges an exhaust gas, and so on, of the engine 22.

In the outboard motor 10 configured as above, a rotational driving force of the crank shaft 44 of the engine 22 is transmitted via the drive shaft 24 and the drive bevel gear 52 to the forward-movement driven bevel gear 54a and the reverse-movement driven bevel gear 54b. Moreover, by the dog clutch 56 meshing with one of the tooth surface of the forward-movement driven bevel gear 54a and the tooth surface of the reverse-movement driven bevel gear 54b, a rotational driving force of one of the forward-movement driven bevel gear 54a and the reverse-movement driven bevel gear 54b is transmitted to the propeller main body 64 via the dog clutch 56 and the propeller shaft 62. As a result, the propeller main body 64 rotates clockwise or counterclockwise with the propeller shaft 62 as a rotational center, thereby causing the ship body Sh to move forward or move in reverse.

Moreover, the mounting bracket 32, the oil case 34, the upper separator 36, and the extension case 38 that are provided within the housing 12 are stacked in the up-down direction to thereby configure a structure 66. The engine 22 and the structure 66 configure a water-cooling type cooling structure in which water such as sea water or fresh water that has been taken in from a water intake port 68 of the housing 12 is supplied to the engine 22 to cool the engine 22. Note that the water used in cooling of the engine 22, and so on, is mixed with the exhaust gas, and is then discharged to outside of the housing 12 through the through-hole 65 of the propeller main body 64.

Figure 2:
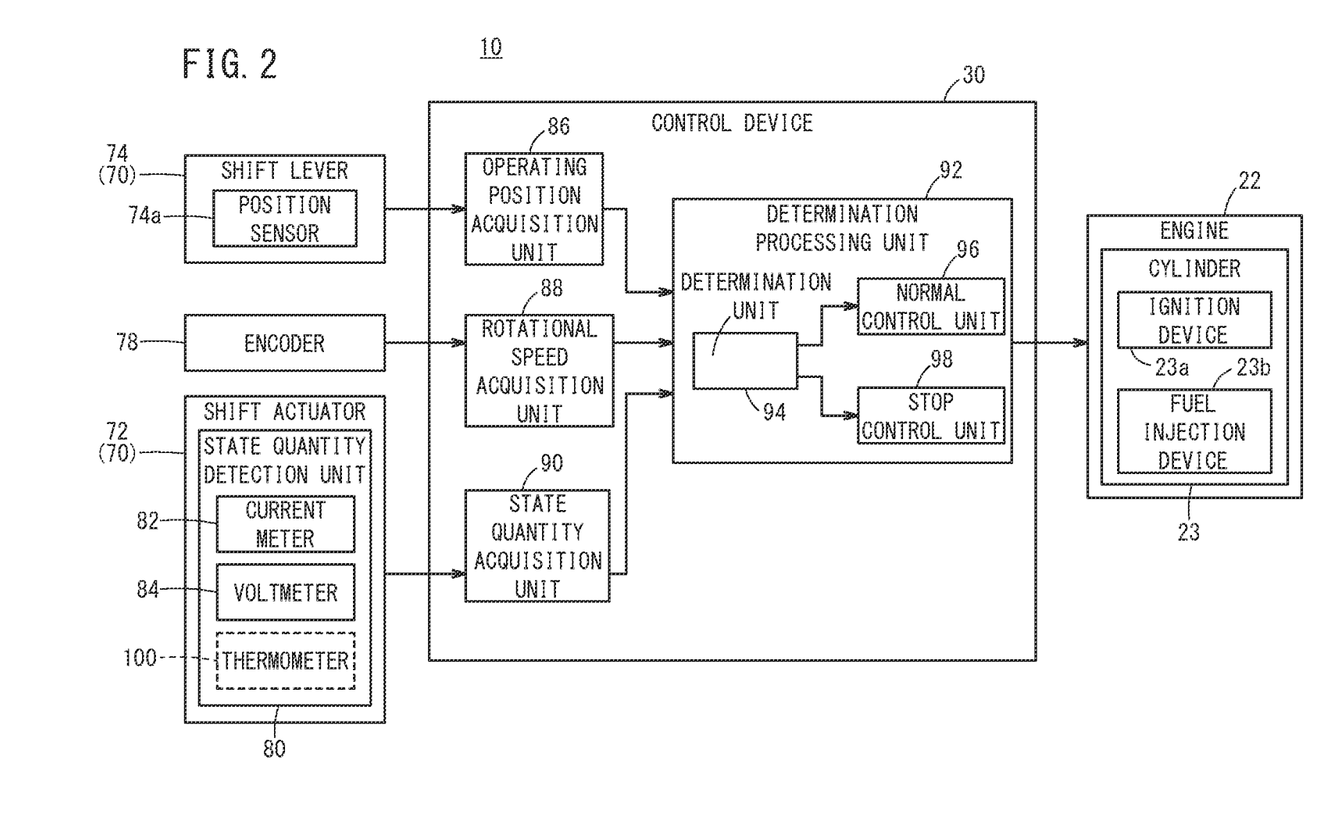
FIG. 2 is a block diagram showing functions of the outboard motor and a control device.

As shown in FIGS. 1 and 2, the transmission structure 70 of the outboard motor 10, in addition to including the above-mentioned gear mechanism 26, operating shaft 60, and so on, includes also: a shift actuator 72 that is mechanically coupled to the operating shaft 60 and that operates the operating shaft 60; and the shift lever 74 by which the user performs a switching operation. The shift actuator 72 is connected to the control device 30 (a control unit) in a manner enabling information communication therewith, and is electrically connected to a battery 76 via an unillustrated power distributing unit. The power distributing unit supplies electric power to the shift actuator 72 based on an operating instruction of the control device 30, and thereby operates the shift actuator 72.

The shift lever 74 is provided in a steering room of the ship body Sh, and is directly operated by hand movement of the user during ship steering. An inside of the shift lever 74 is provided with a position sensor 74a that detects an operating position of the user. The position sensor 74a is an operating position detection unit that regularly detects a current operating position of the shift lever 74 by the user, and transmits detected operating position information to the control device 30 via a communication line such as CAN (or via wireless communication).

Specifically, the shift lever 74 is switched, under operation of the user, to: a forward operating position (an F operating position) by which the ship body Sh is moved forward; a neutral operating position (an N operating position); and a reverse operating position (an R operating position) by which the ship body Sh is moved in reverse. Moreover, the shift lever 74 serves also as a throttle means that transmits to the control device 30 a degree-of-opening with respect to the N operating position (a reference position) by the position sensor 74*a*. That is, the control device 30 adjusts a rotational speed (rpm) of the engine 22 (the fuel injection device 23*b*) based on the degree-of-opening of the shift lever 74. Note that the shift lever 74 may have solely a function of shifting (switching) the rotational output of the engine 22, with the throttle means being separately provided.

The shift actuator 72 of the transmission structure 70 has a mechanism including a combination of, for example, an unillustrated motor, gears, and so on. By electric power of the battery 76 being supplied to the motor of the shift actuator 72, the motor rotationally drives, and its rotational driving force is transmitted to an upper end portion of the operating shaft 60 via the gears. As a result, the operating shaft 60 axially rotates, whereby the cam portion 60*a* provided in the lower end of the operating shaft 60 rotates. As mentioned above, the cam portion 60*a* is inserted in the groove of the shift slider 58 of the gear mechanism 26, and, by rotation of the operating shaft 60, causes the shift slider 58 to move. As a result, a meshing state of the dog clutch 56 and the driven bevel gears 54 is switched. The power distributing unit transmits pulse power of an arbitrary duty ratio by PWM control, according to a target position of a shift position of the shift actuator 72 (a rotational position of the operating shaft 60), and thereby adjusts a rotational moment of the motor of the shift actuator 72. Note that a configuration of the shift actuator 72 is of course not specifically limited.

The shift actuator 72 adjusts the shift position according to the F operating position, the N operating position, and the R operating position of the shift lever 74. That is, the shift position of the shift actuator 72 also has its forward position (its F position), its neutral position (its N position), and its reverse position (its R position) pre-set, and the shift actuator 72 maintains or changes the shift position based on a voltage supplied thereto. For example, the shift position is set so as to be the F position when the supplied voltage is 5 V, the N position when the supplied voltage is 2.5 V, and the R position when the supplied voltage is 1 V.

The control device 30 (the control unit) of the outboard motor 10 is configured as a computer (ECU: Electronic Control Unit) having an unillustrated processor, memory, and input/output interface, and controls operation of the outboard motor 10.

This control device 30 is connected to the ignition device 23*a* and the fuel injection device 23*b* of each of the cylinders 23 of the engine 22. Moreover, the control device 30 controls ignition timing of the ignition devices 23*a* and controls fuel injection timing and injection amount of the fuel injection devices 23*b* to rotate the engine 22 at a target rotational speed. As mentioned above, the control device 30 sets the target rotational speed of the engine 22 based on the degree-of-opening of the shift lever 74. For example, the control device 30 performs control such that the rotational speed of the engine 22 is raised as the operating position of the shift lever 74 separates from the N operating position.

Furthermore, the control device 30 controls operation of the transmission structure 70 in conjunction with the engine 22. That is, the control device 30 instructs the power distributing unit based on operating position information of the shift lever 74, and thereby maintains or changes the shift position of the shift actuator 72.

In detail, upon recognizing that the shift lever 74 has moved from the N operating position to the F operating position, the control device 30 moves the shift position of the shift actuator 72 from the N position to the F position. Thus, in the gear mechanism 26, the dog clutch 56 and the tooth surface of the forward-movement driven bevel gear 54*a* mesh with each other, to thereby cause the propeller main body 64 to rotate in a direction causing the ship body Sh to move forward. Moreover, in the case of the shift lever 74 having separated greatly from the N operating position, the control device 30 raises the rotational speed of the engine 22. As a result, the propeller main body 64 rotates at high speed, and forward speed of the ship body Sh rises.

Conversely, upon recognizing that the shift lever 74 has moved from the N operating position to the R operating position, the control device 30 moves the shift position of the shift actuator 72 from the N position to the R position. Thus, in the gear mechanism 26, the dog clutch 56 and the reverse-movement driven bevel gear 54*b* mesh with each other, to thereby cause the propeller main body 64 to rotate in a direction causing the ship body Sh to move in reverse. Moreover, in the case of the shift lever 74 having separated greatly from the N operating position, the control device 30 raises the rotational speed of the engine 22. As a result, the propeller main body 64 rotates at high speed, and reverse speed of the ship body Sh rises.

Now, in the outboard motor 10, at a time of high-speed rotation of the propeller main body 64 (the engine 22), the propeller main body 64 is subject to strong resistance from the water, so the gears (the inner side tooth surface of the driven bevel gear 54 and the tooth surface of the dog clutch 56) strongly mesh with each other. Therefore, as has already been mentioned, conventionally, even if the shift actuator 72 attempts to change the shift position during high-speed rotation, meshing of the driven bevel gear 54 and the dog clutch 56 does not smoothly disengage, and gear-shifting is carried out (the gears were switched) after rotational speed has sufficiently lowered. As a result, conventionally, a large current (a current pulse of high duty ratio) flows for a long time in the shift actuator 72, and there is a possibility of durability of the shift actuator 72 declining.

The control device 30 according to the present embodiment performs control to suppress at least one of ignition and fuel injection in the engine 22, when certain conditions are satisfied in switching of the position of the shift actuator 72. Here, "suppression of ignition" refers to ignition not being performed at a timing (in a cycle) that ignition was originally supposed to be performed (refers to there being a misfire) during operation of the engine 22, or refers to ignition being delayed during operation of the engine 22. Moreover, "suppression of fuel injection" refers to fuel injection not being performed at a timing (in a cycle) that fuel injection was originally supposed to be performed (refers to there being non-injection) during operation of the engine 22, or refers to injection being performed with an injection amount smaller than the injection amount originally supposed to be injected during operation of the engine 22. Upon at least one of ignition and fuel injection being suppressed, rotational speed of the engine 22 rapidly lowers to instantaneously lower rotational speed of the driven bevel gear 54. As a result, meshing of the driven bevel gear 54 and the dog clutch 56 relaxes (getting easier to disengage the gears) for a short period, and the driven bevel gear 54 and the dog clutch 56 easily separate.

A configuration for performing the above-described control will be specifically described below. Note that hereafter, a configuration performing control to stop both ignition and injection in the engine 22 (called stop control), will be described, unless otherwise specifically mentioned. Moreover, although, hereafter, there will be described an example where all of the plurality of cylinders 23 (the ignition devices 23*a* and the fuel injection devices 23*b*) are stopped in the stop control, there may be adopted a configuration where the stop control stops or suppresses ignition or fuel injection of at least one cylinder 23 of the plurality of cylinders 23.

The control device 30, in addition to performing processing upon acquiring the operating position from the position sensor 74*a*, performs processing upon acquiring also the rotational speed of the engine 22 and a state quantity of the shift actuator 72. Therefore, the engine 22 (or the drive shaft 24) is provided with an encoder 78 (a rotational speed detection unit) for detecting the rotational speed of the engine 22. Moreover, the shift actuator 72 (or the power distributing unit) is provided with a state quantity detection unit 80 for detecting the state quantity of the shift actuator 72.

In the present embodiment, as the state quantity detection unit 80, there is applied a current meter 82 (an oscilloscope) that detects an effective value (a current value) of a current or a waveform of a current pulse supplied to the shift actuator 72. Furthermore, the state quantity detection unit 80 has a voltmeter 84 that detects a voltage supplied to the shift actuator 72. Since the shift position of the shift actuator 72 corresponds to a voltage as mentioned above, the control device 30 can recognize the shift position by a voltage value of the voltmeter 84.

The control device 30 internally creates therein a functional block as shown in FIG. 2, due to an unillustrated control program stored in the memory being executed by the processor. That is, the control device 30 has provided therein an operating position acquisition unit 86, a rotational speed acquisition unit 88, a state quantity acquisition unit 90, and a determination processing unit 92.

The operating position acquisition unit 86 acquires operating position information of the shift lever 74 from the position sensor 74*a*, whereupon it temporarily stores the operating position information in the memory and outputs the operating position information to the determination processing unit 92. The rotational speed acquisition unit 88 acquires rotational speed information from the encoder 78, whereupon it temporarily stores the rotational speed information in the memory and outputs the rotational speed information to the determination processing unit 92. The state quantity acquisition unit 90 acquires state quantity information from the state quantity detection unit 80, whereupon it temporarily stores the state quantity information in the memory and outputs the state quantity information to the determination processing unit 92.

The determination processing unit 92 determines whether to perform normal control or stop control at a time of switching of the shift position, based on the inputted operating position information, rotational speed information, and state quantity information, and implements the normal control or stop control. Now, normal control refers to control that operates the shift actuator 72 while continuing ignition and fuel injection of the engine 22, at a time of switching of the shift position. The determination processing unit 92 is basically set to implement this normal control. Moreover, it performs processing where, upon determining satisfying of stop-initiating conditions, it switches to stop control, and, furthermore, upon determining satisfying of a stop-terminating condition during the stop control, it returns to normal control. In order to achieve this, the determination processing unit 92 is internally provided with a determination unit 94, a normal control unit 96, and a stop control unit 98.

Figure 3:
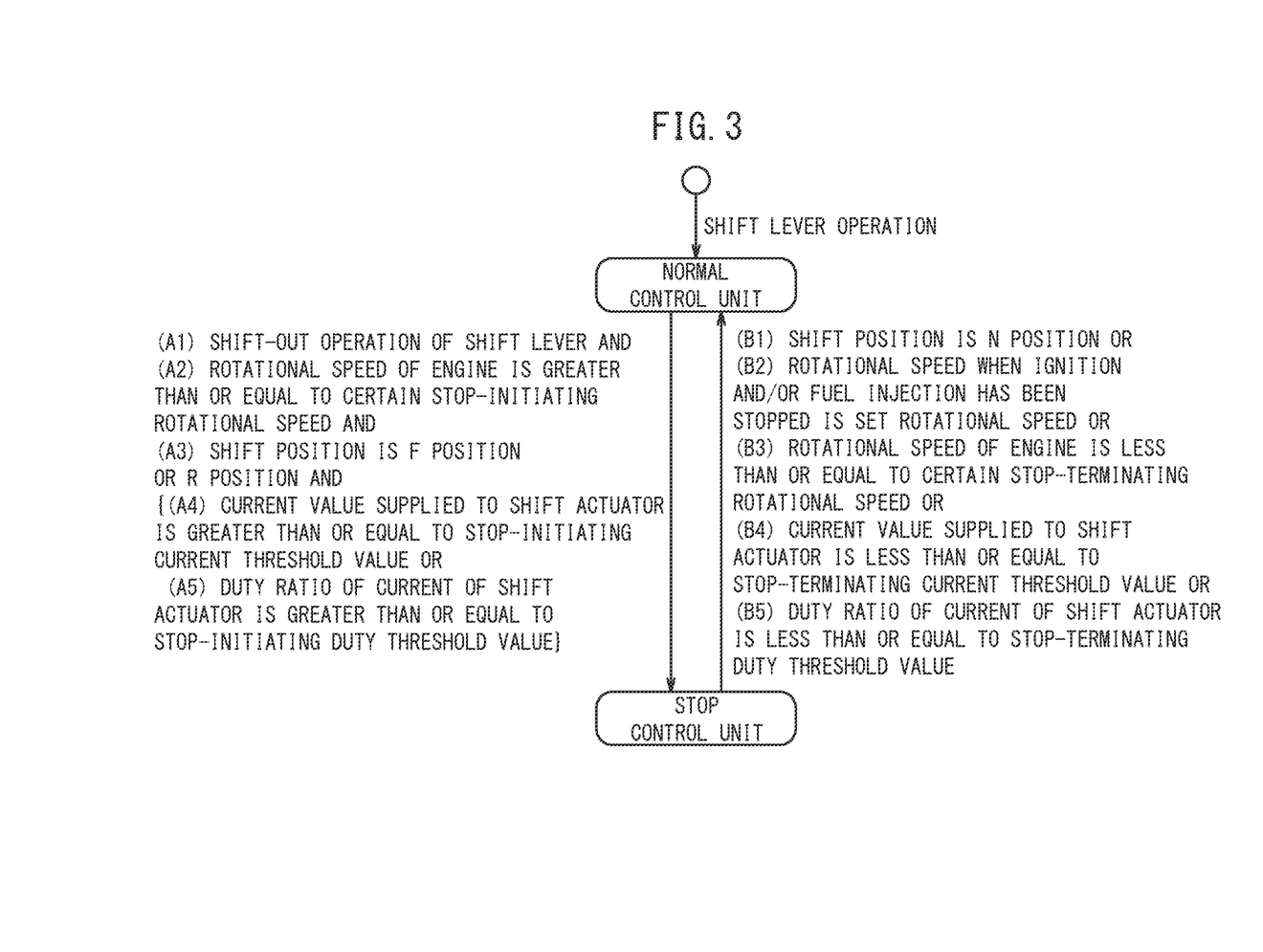
FIG. 3 is a state transition diagram showing conditions when switching between normal control and stop control.

The determination unit 94 starts switching control of the shift position of the shift actuator 72 based on switching of the operating position of the shift lever 74, and, at this time, determines whether the stop-initiating conditions are satisfied or not based on the operating position, the rotational speed, and the state quantity. As shown in FIG. 3, in the case of the stop-initiating conditions being satisfied, the stop control unit 98 is operated, and the shift position is changed upon ignition and fuel injection of the engine 22 being stopped. On the other hand, in the case of the stop-initiating conditions being not satisfied, the normal control unit 96 is operated, and the shift position of the shift actuator 72 is changed while ignition and fuel injection of the engine 22 are continued (without them being stopped).

As the stop-initiating conditions, there may be cited the following conditions (A1) to (A5).
(A1) A shift-out operation of the shift lever 74 is recognized based on the operating position information.
(A2) The rotational speed of the engine 22 is recognized to be greater than or equal to a certain stop-initiating rotational speed (a certain rotational speed) based on the rotational speed information.
(A3) The shift position is recognized to be the F position or the R position based on a voltage value of the state quantity information.
(A4) A current value supplied to the shift actuator 72 is recognized to be greater than or equal to a stop-initiating current threshold value (a stop-initiating threshold value) based on a current value of the state quantity information.
(A5) A duty ratio of current supplied to the shift actuator 72 is recognized to be greater than or equal to a stop-initiating duty threshold value (a stop-initiating threshold value) based on a current pulse waveform of the state quantity information.

The shift-out operation of condition (A1) refers to an operation where the operating position of the shift lever 74 is positioned in the F operating position or the R operating position prior to operation so that the gears are in a meshing state, and movement (shift-out) to another operating position is made due to operation of the user. In other words, in the case of the shift lever 74 being in the F operating position prior to operation, it is operated from the F operating position to the N operating position or R operating position, and, in the case of the shift lever 74 being in the R operating position prior to operation, it is operated from the R operating position to the N operating position or F operating position.

Condition (A2) assumes it to be an implementation requirement of stop control that the engine 22 is rotating at high-speed. This is because, as mentioned above, during high-speed rotation, meshing of the gears (the driven bevel gear 54 and the dog clutch 56) becomes stronger. Although the stop-initiating rotational speed (the certain rotational speed: a rotational speed at which the engine 22 is recognized to be high-speed rotating) is not specifically limited, it should be set to a value of not less than 3000 rpm, for example. Alternatively, the stop-initiating rotational speed should be set to a rotational speed of 50% or more of a maximum rotational speed of the engine 22.

Condition (A3) assumes it to be an implementation requirement of stop control that the shift position of the shift actuator 72 is the F position or the R position, since, in the case of the shift position being the N position, there is no need for stop control to be performed in the first place.

Condition (A4) assumes it to be an implementation requirement of stop control that a current value becomes greater than or equal to the stop-initiating current threshold value, based on the fact that, in the case of meshing of the gears being strong, a load of the shift actuator 72 becomes large and accordingly a supplied current value greatly rises.

Condition (A5) assumes it to be an implementation requirement of stop control that the duty ratio of the current pulse waveform becomes greater than or equal to the stop-initiating duty threshold value, based on the fact that, in the case of meshing of the gears being strong, the duty ratio of the current pulse waveform supplied to the shift actuator 72 increases.

Of the above-described conditions (A1) to (A5), (A1) to (A3) are essential conditions for determining implementation of stop control. On the other hand, regarding conditions (A4) and (A5), it may be said that the shift actuator 72 is subject to a load due to meshing of the gears being strong, if either one of (A4) and (A5) is satisfied. Hence, the determination unit 94 determines implementation of stop control in the case that conditions (A1) to (A3) are all satisfied, and at least one of conditions (A4) and (A5) is satisfied, as the stop-initiating conditions.

Note that the determination processing unit 92 should have a configuration of monitoring the current value to recognize start of supply of electricity to the shift actuator 72, when performing stop control. That is, the control device 30 can recognize the shift actuator 72 operating at a time of initiation of stop control, based on a current direction of the shift actuator 72 becoming a reverse direction.

As the stop-terminating conditions, there may be cited the following conditions (B1) to (B5).
(B1) The shift position is recognized to be the N position based on the voltage value of the state quantity information.
(B2) The rotational speed when at least one of ignition and fuel injection has been stopped is recognized to be a set rotational speed based on control content of the stop control unit 98.
(B3) The rotational speed of the engine 22 is recognized to be less than or equal to a certain stop-terminating rotational speed based on the rotational speed information.
(B4) The current value supplied to the shift actuator 72 is recognized to be less than or equal to a stop-terminating current threshold value (a stop-terminating threshold value) based on the current value of the state quantity information.
(B5) The duty ratio of current supplied to the shift actuator 72 is recognized to be less than or equal to a stop-terminating duty threshold value (a stop-terminating threshold value) based on the current pulse waveform of the state quantity information.

Condition (B1) is assumed to be a termination requirement of stop control, since it may be said that, if the shift position of the shift actuator 72 is the N position, meshing of the gears has disengaged, and the shift position has thereby been switched.

Condition (B2) is assumed to be a termination requirement of stop control, since by stop of at least one of ignition and fuel injection of the engine 22 being implemented at the set rotational speed, there can be secured a period when meshing of the gears is disengaged. For example, the set rotational speed is set to a numerical value that prevents engine stall of the engine 22 from occurring due to implementation of stop control. The determination unit 94 measures the rotational speed of the engine 22 during stop control to thereby determine whether it has reached the set rotational speed or not, and, in the case of it having reached the set rotational speed, terminates the stop control. As a result, the engine 22 itself is prevented from stopping during navigation of the ship body Sh.

Condition (B3) is assumed to be a termination requirement of stop control, since meshing of the gears may be regarded as having weakened in the case of the rotational speed of the engine 22 having lowered to less than or equal to the stop-terminating rotational speed. Although the stop-terminating rotational speed is not specifically limited, it should be set to the likes of 500 rpm, for example.

Condition (B4) assumes it to be a termination requirement of stop control that the current value supplied to the shift actuator 72 becomes less than or equal to the stop-terminating current threshold value (the stop-terminating threshold value), based on the fact that, in the case of meshing of the gears being weak, the current value (the load) supplied to the shift actuator 72 lowers.

Condition (B5) assumes it to be a termination requirement of stop control that the duty ratio of the current pulse waveform supplied to the shift actuator 72 becomes less than or equal to the stop-terminating duty threshold value (the stop-terminating threshold value), based on the fact that, in the case of meshing of the gears being weak, the duty ratio of the current pulse waveform supplied to the shift actuator 72 decreases.

If any one of the above-described conditions (B1) to (B5) is satisfied, there may be said to be a state that the shift actuator 72 is not subject to a large load. Hence, the determination unit 94 determines termination of stop control in the case that at least one of conditions (B1) to (B5) is satisfied. Note that termination of stop control is not limited to any one of conditions (B1) to (B5). Stop control may be configured to be terminated in the case where, for example, two or more conditions are satisfied.

The outboard motor 10 and the control device 30 of the outboard motor 10 according to the present embodiment, are basically configured as above, and their operation will be described below.

In the outboard motor 10, the shift lever 74 is operated to the F operating position or the R operating position by the user, in navigation of the ship body Sh. Note that hereafter, the case of the shift lever 74 having been operated to the F operating position will be representatively described.

The control device 30 acquires the operating position information of the F operating position from the position sensor 74a, operates the ignition device 23a and the fuel injection device 23b in each of the cylinders 23 of the engine 22 based on the degree-of-opening of the shift lever 74, and controls the rotational speed of the engine 22 to a target value.

Figure 4:
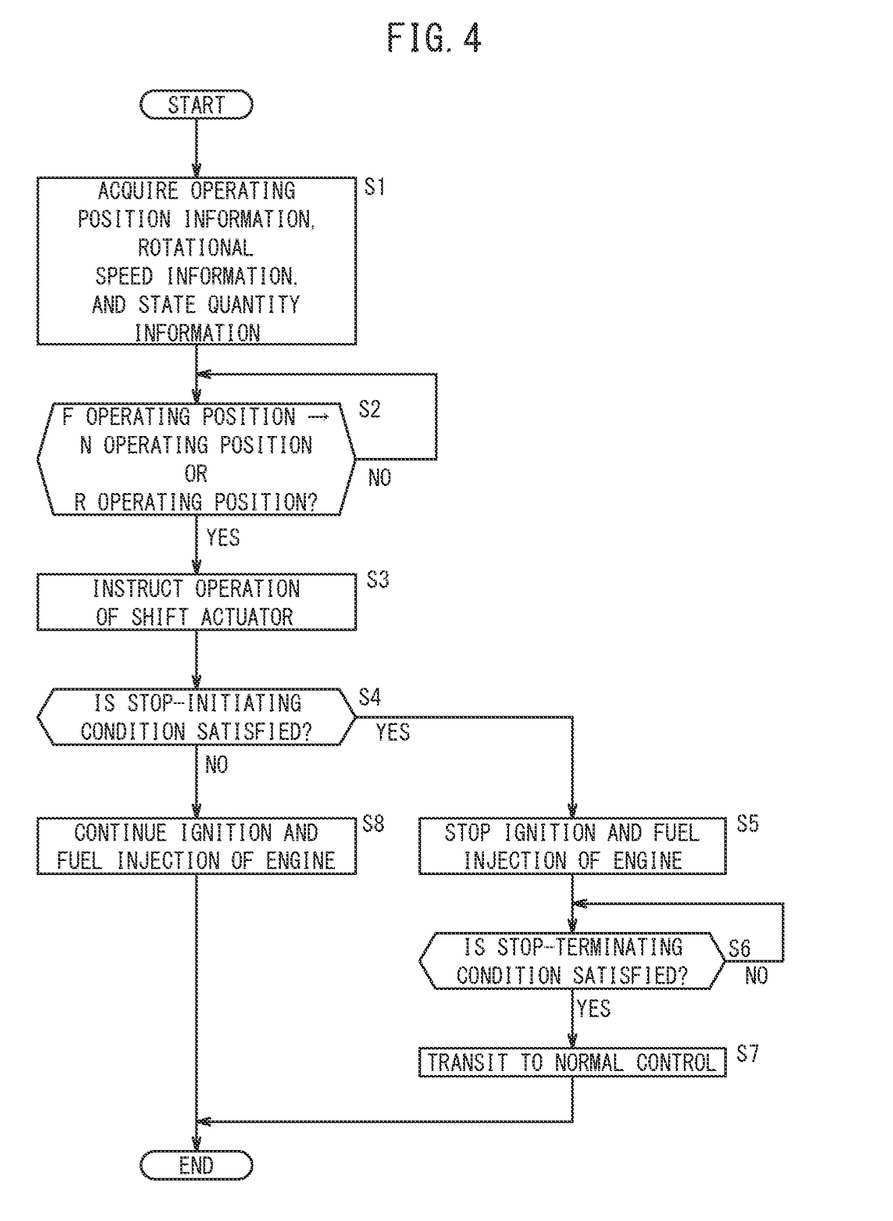
FIG. 4 is a flowchart showing an operation of switching of gears at a time of forward movement of the outboard motor.

As shown in FIG. 4, during navigation of the ship body Sh, the control device 30 is continuously acquiring the operating position information, the rotational speed information, and the state quantity information (step S1). Then, in the case of the shift lever 74 that had been in the F operating position having been switched to the N operating position or the R operating position (step S2: YES), the control device 30 implements switching control based on the operating position information.

In the switching control, the control device 30 (the normal control unit 96) first instructs the power distributing unit to operate the shift position of the shift actuator 72 from the F position to the N position (step S3). As a result, the motor of the shift actuator 72 operates due to electric power supply from the battery 76, and the shift actuator 72 thereby operates to switch the shift position (displace the operating shaft 60).

Then, due to the above-described instruction, the determination unit 94 of the determination processing unit 92 determines whether the stop-initiating condition for initiating stop control is satisfied or not, based on the operating position information, the rotational speed information, and the state quantity information (step S4). As described above, satisfying of the stop-initiating condition occurs in the case of conditions (A1) to (A3) all being satisfied, and at least one condition of conditions (A4) and (A5) being satisfied.

In the case of the stop-initiating condition being satisfied in step S4, the determination unit 94 operates the stop control unit 98 to stop ignition and fuel injection in the engine 22 (step S5). As a result, the rotational speed of the engine 22 lowers, and gear torque of the driven bevel gear 54 that has been strongly meshing with the gear decreases for a short period of time, whereby meshing of the gears relaxes. Therefore, the shift actuator 72 that has received the operation instruction of the shift position displaces the operating shaft 60 during stop of ignition and fuel injection in the engine 22. Hence, the dog clutch 56 smoothly disengages from the forward-movement driven bevel gear 54*a*, and flow of a large current in the shift actuator 72 is suppressed.

Moreover, during implementation of stop control, the determination unit 94 determines whether the stop-terminating condition for terminating stop control is satisfied or not, based on the operating position information, the rotational speed information, and the state quantity information (step S6). As described above, satisfying of the stop-terminating condition occurs in the case of at least one condition of conditions (B1) to (B5) being satisfied.

In the case of the stop-terminating condition being satisfied in step S6, the control device 30 undergoes transition to normal control (control by the normal control unit 96) (step S7). Subsequently, switching control by the shift actuator 72 is ended. In the case of the shift position being yet further changed, the shift actuator 72 is operated by normal control continuing ignition and fuel injection of the engine 22.

On the other hand, in the case of the stop-initiating condition not being satisfied in step S4 (step S4: NO), the determination unit 94 operates the normal control unit 96 without change, to operate the shift actuator 72 while continuing ignition and fuel injection in the engine 22 (step S8). At this time, the rotational speed of the engine 22 is lowered, and meshing of the gears (the driven bevel gear 54 and the dog clutch 56) is not strong, so they easily separate. Therefore, a large current never flows for a long time in the shift actuator 72. In the case of the shift position being changed by normal control, switching control is ended without change.

Note that the present invention is not limited to the above-mentioned embodiment, and that various modifications are possible in line with the essence and gist of the invention. For example, the state quantity detection unit 80 is not limited to using the current meter 82 to monitor the current supplied to the shift actuator 72. As an example, the state quantity detection unit 80 may have a thermometer 100 (refer to the dotted line in FIG. 2) that detects a temperature of the shift actuator 72, and the control device 30 may determine implementation or non-implementation of stop control based on detected temperature information.

Furthermore, in the case of the shift actuator 72 being configured to change the shift position in coordination with a voltage supplied thereto, the control device 30 may determine implementation or non-implementation of stop control based on the voltage value detected by the voltmeter 84. Moreover, the state quantity detection unit 80 may detect, by a pressure sensor, a torque sensor, or the like, the load (torque) applied to the shift actuator 72 as the state quantity, and, moreover, may have a configuration detecting electric power as the state quantity. In short, the state quantity of the shift actuator 72 may be detected by a variety of detectors capable of detecting the load applied to the shift actuator 72 depending on the structure of the shift actuator 72. In this case, the control device 30 should have a state quantity threshold value corresponding to the detected state quantity, and implement stop control in the case of the state quantity being greater than or equal to the state quantity threshold value.

Technical ideas and advantages understandable from the above-mentioned embodiment will be described below.

The outboard motor 10 performs control to suppress at least one of ignition and fuel injection in the internal combustion engine (the engine 22). This control results in that, even when the gears (the driven bevel gear 54 and the dog clutch 56) switched by the shift actuator 72 are strongly meshing due to high-speed rotation of the internal combustion engine, the rotational speed of the engine 22 can be rapidly lowered to thereby weaken meshing of the gears. Hence, the outboard motor 10 makes it possible for meshing of the gears to be simply disengaged, and enables durability of the shift actuator 72 to be significantly improved.

Moreover, the control unit (the control device 30) stops at least one of ignition and fuel injection in the internal combustion engine (the engine 22) at a time of the control. This enables the rotational speed of the engine 22 to be lowered in a shorter time, and makes it possible for meshing of the gears to be quickly disengaged.

Moreover, the control unit (the control device 30) delays ignition of the internal combustion engine (the engine 22) at a time of the control. Even delaying ignition in this way results in the rotational speed of the engine 22 lowering, and hence allows meshing of the gears to be favorably disengaged.

Moreover, the internal combustion engine (the engine 22) has the plurality of cylinders 23; and the control unit (the control device 30) suppresses ignition or fuel injection in at least one cylinder 23 of the plurality of cylinders 23 at a time of the control. Thus, the outboard motor 10 makes it possible for gear torque to be reduced and for gear disengagement to be made easier, even when ignition or fuel injection in at least one cylinder 23 of the plurality of cylinders 23 is suppressed.

Moreover, the state quantity detection unit 80 detects at least one of the current, the voltage, and the temperature of the shift actuator 72, as the state quantity. Detecting at least one of the current, the voltage, and the temperature of the shift actuator 72 as the state quantity in this way enables a load applied during operation of the shift actuator 72 to be suitably recognized. In other words, by the outboard motor 10 implementing stop control when the current, the voltage, or the temperature (the load) during operation of the shift actuator 72 has been determined to be large, it becomes possible for the load of the shift actuator 72 to be suitably decreased.

Moreover, the state quantity detection unit 80 detects at least one of the effective value of the current and the duty ratio of the current, as the current of the shift actuator 72; and the control unit (the control device 30) compares at least one of the detected effective value of the current and the detected duty ratio of the current with the corresponding stop-initiating threshold value, and, if at least one of the effective value of the current and the duty ratio of the current is greater than or equal to the corresponding stop-initiating threshold value, the control unit implements the control. Detecting at least one of the effective value of the current and the duty ratio of the current in the shift actuator 72 in this way enables the outboard motor 10 to more accurately recognize the load applied to the shift actuator 72.

Moreover, the control unit (the control device 30), during implementation of the control, compares at least one of the detected effective value of the current and the detected duty ratio of the current with the corresponding stop-terminating threshold value, and, if at least one of the effective value of the current and the duty ratio of the current has become less than or equal to the corresponding stop-terminating threshold value, the control unit ends the control. As a result, the outboard motor 10 can accurately recognize that the load applied to the shift actuator 72 has decreased, and it therefore becomes possible for control to be smoothly ended.

Moreover, the shift lever 74 is switchable to the forward operating position, the neutral operating position, and the reverse operating position; and the control unit (the control device 30) implements the control based on the shift lever 74 being switched from the forward operating position to the neutral operating position or the reverse operating position, or the shift lever 74 being switched from the reverse operating position to the neutral operating position or the forward operating position. That is, the outboard motor 10 performs control during the shift-out operation where the F operating position is operated to the N operating position or the R operating position, and the R operating position is operated to the N operating position or the F operating position. This makes it possible for gear disengagement to be made easy by control, even when the gears are strongly meshing prior to the shift-out operation.

Moreover, the control unit (the control device 30) ends the control if, during implementation of the control, the shift position of the shift actuator 72 has attained the neutral position. In the case of the shift position having attained the N position, meshing of the gears may be said to be in a released state, hence, by ending the control, the outboard motor 10 can suitably implement post-shifting control.

Moreover, the control unit (the control device 30) has the rotational speed detection unit (the encoder 78) for detecting the rotational speed of the internal combustion engine (the engine 22), and ends the control if, during implementation of the control, the rotational speed has become less than or equal to the stop-terminating rotational speed. In the case of the rotational speed of the engine 22 having become less than or equal to the stop-terminating rotational speed, although meshing of the gears is placed in a weakened state, there is a possibility that engine stall will occur. Hence, by the shift position being suitably switched and control being ended at an early stage, the outboard motor 10 can stably operate the engine 22.

Moreover, the control unit (the control device 30) measures the rotational speed of the internal combustion engine (the engine 22) at a time of having stopped at least one of ignition and fuel injection in the internal combustion engine, and, if the measured rotational speed has reached the set rotational speed, the control unit ends the control. In the outboard motor 10, in a period during which the rotational speed of the engine 22 is approaching the set rotational speed during control, meshing of the gears is weakened so that the shift position can be suitably switched. Hence, the outboard motor 10 is capable of ending control at an early stage, and can suitably prevent engine stall.

Moreover, the present invention is the control device 30 of the outboard motor 10, the outboard motor 10 including the shift actuator 72 that shifts the rotational output of the internal combustion engine (the engine 22) based on the position of the shift lever 74 operated by the user, the control device 30 including: the operating position acquisition unit 86 that acquires the operating position of the shift lever 74; the state quantity acquisition unit 90 that acquires the state quantity of the shift actuator 72; and the determination processing unit 92 that, when the operating position has been switched, determines whether the state quantity is greater than or equal to the stop-initiating threshold value or not, and, if the state quantity is greater than or equal to the stop-initiating threshold value, performs control to suppress at least one of ignition and fuel injection in the internal combustion engine. As a result, the control device 30 makes it possible for meshing of the gears to be simply disengaged, and for durability of the shift actuator 72 to thereby be significantly improved.

What is claim is:

1. An outboard motor including a shift actuator that shifts a rotational output of an internal combustion engine based on a position of a shift lever operated by a user, the outboard motor comprising:
   an operating position detection unit that detects an operating position of the shift lever;
   a state quantity detection unit that detects at least one of a current, a voltage, and a temperature of the shift actuator, as a state quantity of the shift actuator; and
   a control unit that performs processing based on the detected operating position and state quantity,
   wherein, when the operating position has been switched, the control unit determines whether the state quantity is greater than or equal to a stop-initiating threshold value or not, and, if the state quantity is greater than or equal to the stop-initiating threshold value, the control unit performs control to suppress at least one of ignition and fuel injection in the internal combustion engine.

2. The outboard motor according to claim 1, wherein the control unit stops at least one of ignition and fuel injection in the internal combustion engine at a time of the control.

3. The outboard motor according to claim 1, wherein the control unit delays ignition of the internal combustion engine at a time of the control.

4. The outboard motor according to claim 1, wherein:
   the internal combustion engine includes a plurality of cylinders, and
   the control unit suppresses ignition or fuel injection in at least one cylinder of the plurality of cylinders at a time of the control.

5. The outboard motor according to claim 1, wherein:
   the state quantity detection unit detects at least one of an effective value of the current and a duty ratio of the current, as the current of the shift actuator, and
   the control unit compares at least one of the detected effective value of the current and the detected duty ratio of the current with the corresponding stop-initiating threshold value, and, if at least one of the effective value of the current and the duty ratio of the current is greater than or equal to the corresponding stop-initiating threshold value, the control unit implements the control.

6. The outboard motor according to claim 5, wherein
the control unit, during implementation of the control, compares at least one of the detected effective value of the current and the detected duty ratio of the current with the corresponding stop-terminating threshold value, and, if at least one of the effective value of the current and the duty ratio of the current has become less than or equal to the corresponding stop-terminating threshold value, the control unit ends the control.

7. The outboard motor according to claim 1, wherein:
the shift lever is switchable to a forward operating position, a neutral operating position, and a reverse operating position, and
the control unit implements the control based on the shift lever being switched from the forward operating position to the neutral operating position or the reverse operating position, or the shift lever being switched from the reverse operating position to the neutral operating position or the forward operating position.

8. The outboard motor according to claim 1, wherein
the control unit ends the control if, during implementation of the control, a shift position of the shift actuator has attained a neutral position.

9. The outboard motor according to claim 1, further comprising a rotational speed detection unit that detects a rotational speed of the internal combustion engine, wherein the control unit ends the control if, during implementation of the control, the rotational speed has become less than or equal to a stop-terminating rotational speed.

10. The outboard motor according to claim 1, wherein
the control unit measures a rotational speed of the internal combustion engine at a time of having stopped at least one of ignition and fuel injection in the internal combustion engine, and, if the measured rotational speed has reached a set rotational speed, the control unit ends the control.

11. A control device of an outboard motor, the outboard motor including a shift actuator that shifts a rotational output of an internal combustion engine based on a position of a shift lever operated by a user, the control device comprising:
an operating position acquisition unit that acquires an operating position of the shift lever;
a state quantity acquisition unit that acquires at least one of a current, a voltage, and a temperature of the shift actuator, as a state quantity of the shift actuator; and
a determination processing unit that, when the operating position has been switched, determines whether the state quantity is greater than or equal to a stop-initiating threshold value or not, and, if the state quantity is greater than or equal to the stop-initiating threshold value, performs control to suppress at least one of ignition and fuel injection in the internal combustion engine.

\* \* \* \* \*